(12) United States Patent
Bai et al.

(10) Patent No.: US 9,703,421 B2
(45) Date of Patent: Jul. 11, 2017

(54) TOUCH POSITIONING METHOD FOR TOUCH DISPLAY DEVICE, AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Bai, Beijing (CN); Wei Sun, Beijing (CN); Zhaohui Meng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 46 days.

(21) Appl. No.: 14/771,715

(22) PCT Filed: Oct. 24, 2014

(86) PCT No.: PCT/CN2014/089382
§ 371 (c)(1),
(2) Date: Aug. 31, 2015

(87) PCT Pub. No.: WO2016/026206
PCT Pub. Date: Feb. 25, 2016

(65) Prior Publication Data
US 2016/0195998 A1    Jul. 7, 2016

(30) Foreign Application Priority Data
Aug. 18, 2014  (CN) .......................... 2014 1 0407178

(51) Int. Cl.
*G06F 3/041* (2006.01)
*G06F 3/044* (2006.01)
*G02F 1/1333* (2006.01)

(52) U.S. Cl.
CPC ............ *G06F 3/0418* (2013.01); *G06F 3/044* (2013.01); *G06F 3/0412* (2013.01);
(Continued)

(58) Field of Classification Search
CPC .... G06F 3/0412; G06F 3/0416; G06F 3/0418; G06F 3/044; G06F 2203/04104; G02F 1/13338
See application file for complete search history.

(56) References Cited

U.S. PATENT DOCUMENTS

2006/0097991 A1* 5/2006 Hotelling .............. G06F 3/0416
                                                    345/173
2007/0200833 A1* 8/2007 Park ...................... G06F 1/3203
                                                    345/173
(Continued)

FOREIGN PATENT DOCUMENTS

| CN | 202285118 U | 6/2012 |
| CN | 102707821 A | 10/2012 |

(Continued)

OTHER PUBLICATIONS

Written Opinion of the International Searching Authority for international application No. PCT/CN2014/089382.

*Primary Examiner* — Michael J Eurice
(74) *Attorney, Agent, or Firm* — Harness, Dickey & Pierce, P.L.C.

(57) ABSTRACT

The present disclosure provides a touch positioning method for a touch display device, and the touch display device. When it is detected that a touch operation has been made on a touch panel, whether or not the touch operation is effective is determined. When the touch operation is effective, coor-
(Continued)

dinate information about a touch point are sampled multiple times, so as to acquire a plurality of initial coordinates of the touch point. A grouping calculation is performed on the plurality of initial coordinates of the touch point, so as to determine final coordinates of the touch point.

12 Claims, 5 Drawing Sheets

(52) U.S. Cl.
CPC ........ G06F 3/0416 (2013.01); G02F 1/13338 (2013.01); G06F 2203/04104 (2013.01)

(56) References Cited

U.S. PATENT DOCUMENTS

| | | | | |
|---|---|---|---|---|
| 2008/0309634 | A1* | 12/2008 | Hotelling | G06F 1/1626 345/173 |
| 2009/0085887 | A1* | 4/2009 | Chueh | G06F 3/0414 345/173 |
| 2009/0184934 | A1* | 7/2009 | Lin | G06F 3/0416 345/173 |
| 2010/0073318 | A1* | 3/2010 | Hu | G06F 3/044 345/174 |
| 2010/0085322 | A1* | 4/2010 | Mamba | G06F 3/044 345/173 |
| 2010/0117978 | A1* | 5/2010 | Shirado | B25J 13/084 345/173 |
| 2010/0127995 | A1* | 5/2010 | Rigazio | G06F 3/04886 345/173 |
| 2010/0155153 | A1* | 6/2010 | Zachut | G06F 3/03545 178/18.03 |
| 2010/0295824 | A1* | 11/2010 | Noguchi | G02F 1/13338 345/175 |
| 2011/0216033 | A1* | 9/2011 | Mamba | G06F 3/0418 345/174 |
| 2011/0216036 | A1 | 9/2011 | Zhang et al. | |
| 2011/0248939 | A1* | 10/2011 | Woo | G06F 3/0416 345/173 |
| 2011/0285654 | A1* | 11/2011 | Park | G06F 3/0418 345/173 |
| 2012/0044170 | A1* | 2/2012 | Homma | G06F 3/04886 345/173 |
| 2012/0169615 | A1* | 7/2012 | Chang | G06F 3/0488 345/173 |
| 2012/0249433 | A1* | 10/2012 | Deng | G06F 3/0418 345/173 |
| 2012/0249476 | A1* | 10/2012 | Schwartz | G06F 3/044 345/174 |
| 2013/0044062 | A1* | 2/2013 | Bose | G06F 3/0414 345/173 |
| 2013/0050133 | A1* | 2/2013 | Brakensiek | G06F 3/0416 345/174 |
| 2013/0135216 | A1* | 5/2013 | Chiang | G06F 3/044 345/173 |
| 2013/0154983 | A1* | 6/2013 | Christiansson | G06F 3/0416 345/173 |
| 2013/0321332 | A1* | 12/2013 | Yoshimura | G06F 3/0418 345/174 |
| 2014/0071095 | A1* | 3/2014 | Godsill | G06F 3/0418 345/177 |
| 2014/0078078 | A1* | 3/2014 | Lee | G06F 3/0488 345/173 |
| 2014/0125623 | A1* | 5/2014 | Atkinson | G06F 3/044 345/174 |
| 2014/0160043 | A1* | 6/2014 | Hwang | G06F 3/0418 345/173 |
| 2014/0160057 | A1* | 6/2014 | Lee | G06F 3/0418 345/174 |
| 2014/0210780 | A1* | 7/2014 | Lee | G06F 3/03545 345/174 |
| 2014/0368436 | A1* | 12/2014 | Abzarian | G06F 3/0488 345/168 |
| 2015/0130742 | A1* | 5/2015 | Chen | G06F 3/044 345/174 |
| 2015/0160762 | A1* | 6/2015 | Hu | G06F 3/044 345/174 |
| 2015/0248178 | A1* | 9/2015 | Oh | G06F 3/0416 345/174 |
| 2015/0253928 | A1* | 9/2015 | Yamanaka | G06F 3/0421 345/175 |
| 2015/0268750 | A1* | 9/2015 | Kwon | G06F 3/0418 345/173 |
| 2016/0012348 | A1* | 1/2016 | Johnson | G06N 5/027 706/12 |

FOREIGN PATENT DOCUMENTS

| | | |
|---|---|---|
| CN | 103135832 A | 6/2013 |
| CN | 103645822 A | 3/2014 |
| KR | 20110087015 A | 8/2011 |

* cited by examiner

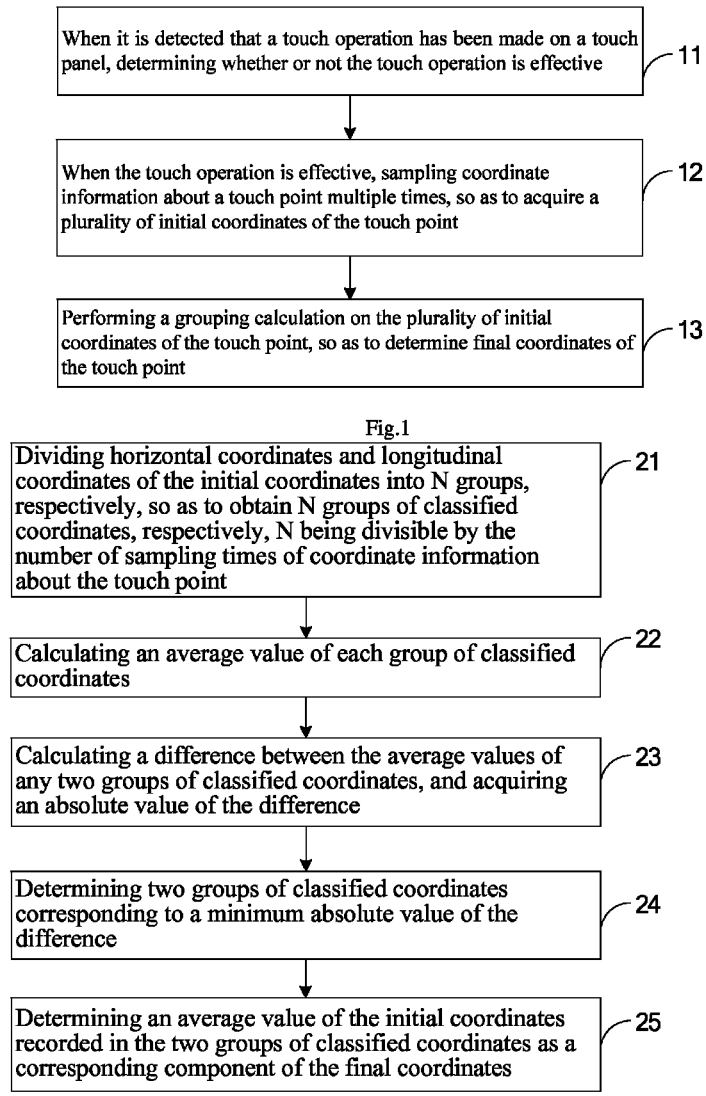

TOUCH POSITIONING METHOD FOR TOUCH DISPLAY DEVICE, AND TOUCH DISPLAY DEVICE

CROSS-REFERENCE TO RELATED APPLICATIONS

This application is the U.S. national phase of PCT Application No. PCT/CN2014/089382 filed on Oct. 24, 2014, which claims a priority of the Chinese Patent Application No. 201410407178.8 filed on Aug. 18, 2014, the disclosures of which are incorporated in their entirety by reference herein.

TECHNICAL FIELD

The present disclosure relates to the field of display technology, in particular to a touch positioning method for a touch display device, and the touch display device.

BACKGROUND

For a method for determining a touch point adopted by an existing surface-capacitive touch panel, a part of charges is absorbed by a finger from the touch point, so as to form a very tiny current consisting of four sub-currents. A size of the sub-current flowing through one of four corner electrodes is proportional to a distance from the finger to a corresponding corner. Through accurately calculating a ratio of the four sub-currents by a controller, it is able to determine a position of the touch point.

However, the calibration in this method is complex and it is required to eliminate electromagnetic interference (EMI). In addition, this method does not support multi-point touch.

Currently, the multi-point touch may be achieved by a mainstream projection-type capacitive panel. However, due to a series of defects in design and process, the touch point is susceptible to the external environment and thereby easily drifted. Although the interference may be eliminated by some mature algorithms, the overhead of a processor will be increased.

SUMMARY

An object of the present disclosure is to provide a touch positioning method for a touch display device, and the touch display device, so as to accurately position a touch point by eliminating interference on the positioning of the touch point from an external environment, and to prevent the overhead of a processor from being increased due to the easy implementation as well as the use of a grouping calculation mode.

In one aspect, the present disclosure provides in one embodiment a touch positioning method for a touch display device, including steps of: when it is detected that a touch operation has been made on a touch panel, determining whether or not the touch operation is effective; when the touch operation is effective, sampling coordinate information about a touch point multiple times, so as to acquire a plurality of initial coordinates of the touch point; and performing a grouping calculation on the plurality of initial coordinates of the touch point, so as to determine final coordinates of the touch point.

Alternatively, the step of, when it is detected that the touch operation has been made on the touch panel, determining whether or not the touch operation is effective includes: when the touch operation has been made, acquiring a count change value for a channel capacitance corresponding to a touch region; and when a difference between a maximum value of the count change value and an original reference value is greater than a first threshold, determining that the touch operation is effective, the original reference value being an average value of a plurality of channel capacitances obtained within a predetermined time period before the touch operation, and the first threshold being a predetermined percentage of the original reference value.

Alternatively, the step of performing grouping calculation on the plurality of initial coordinates of the touch point so as to determine the final coordinates of the touch point includes: dividing horizontal coordinates and longitudinal coordinates of the initial coordinates into N groups, respectively, so as to obtain N groups of classified coordinates, N being divisible by the number of sampling times of coordinate information about the touch point; for the N groups of classified coordinates of horizontal coordinates and for the N groups of classified coordinates of longitudinal coordinates, performing, respectively, steps of: calculating an average value of each group of classified coordinates; calculating a difference between the average values of any two groups of classified coordinates, and acquiring an absolute value of the difference; determining two groups of classified coordinates corresponding to a minimum absolute value of the difference; and determining an average value of the initial coordinates recorded in the two groups of classified coordinates as a corresponding component of the final coordinates.

Alternatively, the step of performing the grouping calculation on the plurality of initial coordinates of the touch point so as to determine the final coordinates of the touch point further includes: determining a relation between the absolute value of the difference and a second threshold, and when the absolute value of the difference is less than or equal to the second threshold, performing the subsequent step of determining the two groups of classified coordinates corresponding to the minimum absolute value of the difference.

Alternatively, the number of sampling times is 9, N is 3 and the second threshold is 3.

Alternatively, for a mutual-capacitive touch panel, the channel capacitance is a coupling capacitance at a position where a touch driving electrode overlaps a touch sensing electrode, and for a self-capacitive touch panel, the channel capacitance is a capacitance of a sensing unit itself at a certain potential.

Alternatively, the original reference value is an average value of the channel capacitances collected within a time period for 20 frames before the touch operation.

Alternatively, the first threshold is 5% to 30% of the original reference value.

In another aspect, the present disclosure provides in one embodiment a touch display device, including: a determination module configured to, when it is detected that a touch operation has been made on a touch panel, determine whether or not the touch operation is effective; an acquisition module configured to, when the touch operation is effective, sample coordinate information about a touch point multiple times, so as to acquire a plurality of initial coordinates of the touch point; and a calculation module configured to perform a grouping calculation on the plurality of initial coordinates of the touch point, so as to determine final coordinates of the touch point.

Alternatively, the determination module includes: an acquisition unit configured to, when the touch operation has been made, acquire a count change value for a channel capacitance corresponding to a touch region; and a first determination unit configured to, when a difference between a maximum value of the count change value and an original reference value is greater than a first threshold, determine that the touch operation is effective, the original reference value being an average value of a plurality of channel capacitances obtained within a predetermined time period before the touch operation, and the first threshold being a predetermined percentage of the original reference value.

Alternatively, the calculation module includes: a grouping unit configured to divide horizontal coordinates and longitudinal coordinates of the initial coordinates into N groups, respectively, so as to obtain N groups of classified coordinates, respectively, N being divisible by the number of sampling times of coordinate information about the touch point; a first calculation unit configured to an average value of each group of classified coordinates; a second calculation unit configured to calculate a difference between the average values of any two groups of classified coordinates, and acquiring an absolute value of the difference; a second determination unit configured to determine two groups of classified coordinates corresponding to a minimum absolute value of the difference; and a third determination unit configured to determine an average value of the initial coordinates recorded in the two groups of classified coordinates as a corresponding component of the final coordinates.

Alternatively, the calculation module further includes a fourth determination unit configured to determine a relation between the absolute value of the difference and a second threshold, and when the absolute value of the difference is less than or equal to the second threshold, trigger the second determination unit to determine the two groups of classified coordinates corresponding to the minimum absolute value of the difference.

Alternatively, the fourth determination unit is further configured to, when all the absolute values of the differences are greater than a second threshold, determine that the initial coordinates in the groups of classified coordinates as ineffective data, and abandon the ineffective data.

Alternatively, the second threshold is 3.

According to the touch positioning method and the touch display device in the embodiments of the present disclosure, when it is detected that the touch operation has been made on the touch panel, it is determined that whether or not the touch operation is effective. When the touch operation is effective, the coordinate information about the touch point is sampled multiple times, so as to acquire a plurality of initial coordinates of the touch point. Then, the grouping calculation is performed on the plurality of initial coordinates of the touch point, so as to determine the final coordinates of the touch point. As a result, it is able to eliminate the interference on the positioning of the touch point from an external environment, thereby to accurately position the touch point. In addition, due to the easy implementation as well as the use of a grouping calculation mode, it is able to prevent the overhead of a processor from being increased.

BRIEF DESCRIPTION OF THE DRAWINGS

FIG. 1 is a flow chart of a touch positioning method for a touch display device according to one embodiment of the present disclosure;

FIG. 2 is another flow chart of the touch positioning method for the touch display device according to one embodiment of the present disclosure;

DETAILED DESCRIPTION

Figure 3:
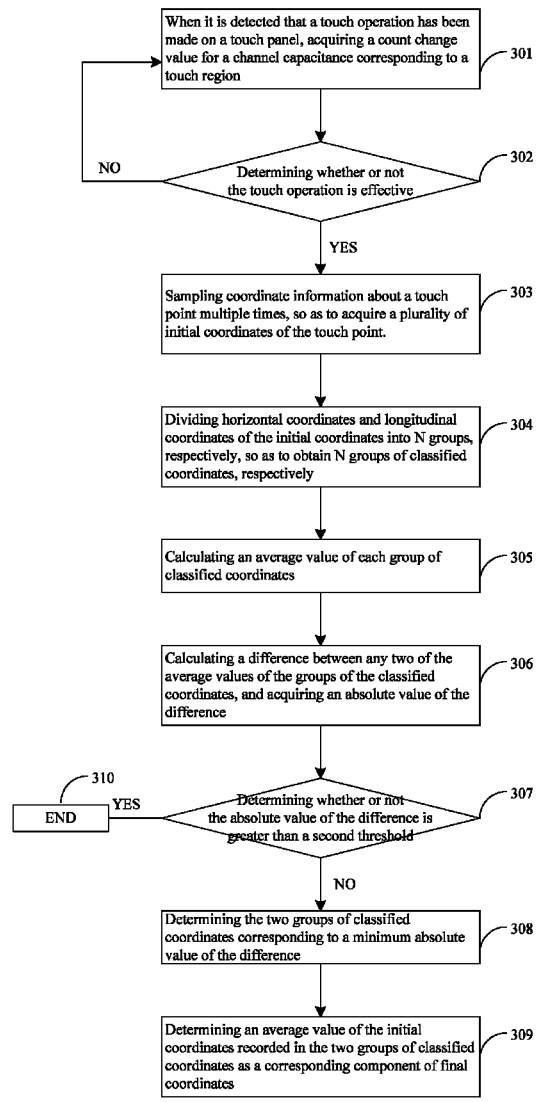
FIG. 3 is yet another flow chart of the touch positioning method for the touch display device according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in one embodiment a touch positioning method for a touch display device which, as shown in FIG. 1, may include:

Step 11: when it is detected that a touch operation has been made on a touch panel, determining whether or not the touch operation is effective;

Step 12: when the touch operation is effective, sampling coordinate information about a touch point multiple times, so as to acquire a plurality of initial coordinates of the touch point; and Step 13: performing a grouping calculation on the plurality of initial coordinates of the touch point, so as to determine final coordinates of the touch point.

According to the touch positioning method for the touch display device according to the embodiments of the present disclosure, through determining whether or not the touch operation is effective, it is able to eliminate the interference on the positioning of the touch point from an external environment, thereby to accurately position the touch point. In addition, due to the easy implementation as well as the use of a grouping calculation mode, it is able to prevent the overhead of a processor from being increased.

Step 11 of, when it is detected that the touch operation has been made on the touch panel, determining whether or not the touch operation is effective may include: when the touch operation has been made, acquiring a count change value for a channel capacitance corresponding to a touch region; and when a difference between a maximum value of the count change value and an original reference value is greater than a first threshold, determining that the touch operation is effective, the original reference value being an average value of a plurality of channel capacitances obtained within a predetermined time period before the touch operation, and the first threshold being a predetermined percentage of the original reference value.

The channel capacitance involved in the embodiments of the present disclosure may be a coupling capacitance at a position where a touch driving electrode overlaps a touch sensing electrode (for a mutual-capacitive touch panel), or a capacitance of a sensing unit itself at a certain potential (for a self-capacitive touch panel).

When the touch has been made, there is a change value for each of the channel capacitances generated at the touch region, regardless of the kind of the above-mentioned capacitances, and this change value is just the count change value for the channel capacitance.

In the embodiments of the present disclosure, all the count change values for the channel capacitances may be compared with each other in pairs, so as to determine a maximum value thereof.

Then, a relation between the difference between the maximum value and an original reference value, and the first threshold may be determined. When the difference is greater than the first threshold, it is determined that the touch operation is effective; otherwise, the touch operation is ineffective, and the subsequent steps are not performed any more.

The original reference value may be an average value of a plurality of channel capacitances obtained within a predetermined time period before the touch operation.

Alternatively, in embodiments of the present disclosure, the original reference value may be an average value of the channel capacitances collected within a time period for 20 frames before the touch operation.

Through an appropriate threshold, it is able to effectively prevent the occurrence of a misoperation due to the noise from the outside or human factors, and to affect the sensitivity when the touch panel is touched by a finger. Hence, in the embodiments of the present disclosure, the first threshold may be a predetermined percentage of the original reference value, e.g., 5% to 30%, so as to prevent the influence of the misoperation on the determination of the touch positional information.

According to the touch positioning method in the embodiments of the present disclosure, after it is determined that the touch operation is effective, initial coordinates of the touch point may be acquired by sampling multiple times within a time period (e.g., several seconds), and then the grouping calculation may be performed, so as to determine the final coordinates of the touch point.

In the embodiments of the present disclosure, in order to prevent the acquired coordinates from being remarkably offset due to the sudden pulse interference, a novel coordinate calculation method is presented. In other words, in the embodiments of the present disclosure, as shown in FIG. 2, Step 13 of performing the grouping calculation on the plurality of initial coordinates of the touch point so as to determine the final coordinates of the touch point may include:

Step 21: dividing horizontal coordinates and longitudinal coordinates of the initial coordinates into N groups, respectively, so as to obtain N groups of classified coordinates, respectively, N being divisible by the number of sampling times of coordinate information about the touch point; for the N groups of classified coordinates of horizontal coordinates and for the N groups of classified coordinates of longitudinal coordinates, performing, respectively, steps of:

Step 22: calculating an average value of each group of classified coordinates;

Step 23: calculating a difference between the average values of any two groups of classified coordinates, and acquiring an absolute value of the difference;

Step 24: determining two groups of classified coordinates corresponding to a minimum absolute value of the difference; and Step 25: determining an average value of the initial coordinates recorded in the two groups of classified coordinates as a corresponding component of the final coordinates.

For example, when the effective touch operation has been made, the coordinate information about the touch point may be sampled multiple times (e.g., 9 times), so as to acquire a plurality of initial coordinates of the touch point, including X-axis coordinates and Y-coordinates, and then the acquired initial coordinates are stored in xa[9] and ya[9], respectively.

In order to reduce a computational burden of the processor, xa[9] and ya[9] may be divided into three groups, respectively, in the embodiments of the present disclosure, i.e., the initial coordinates acquired in 9 samples may be divided into N=3 groups of classified coordinates, and then the average values of these three groups of classified coordinates may be acquired and stored in xb[3] and yb[3], respectively.

By taking the X-axis coordinates as an example, $xb[0]=(xa[0]+xa[1]+xa[2])/3,$ $xb[1]=(xa[3]+xa[4]+xa[5])/3,$ and $xb[2]=(xa[6]+xa[7]+xa[8])/3.$ The difference between the average values of any two of these three groups of classified coordinates may be calculated as follows:

$m0=xb[0]-xb[1],$ $m1=xb[1]-xb[2],$ and $m2=xb[2]-xb[0].$

Then, the absolute value of each difference may be acquired.

The two groups of classified coordinates corresponding to a minimum absolute value among all the absolute values of the differences may be determined. For example, when the absolute value of m0 in the above absolute values of the differences is the minimum, the two groups of classified coordinates, i.e., xb[0] and xb[1], may be determined, and then an average value of the initial coordinates recorded in these two groups of classified coordinates, i.e., (xa[0]+xa[1]+xa[2]+xa[3]+xa[4]+xa[5])/6, may be determined as the X-axis coordinate of the final coordinates. Identically, the Y-axis coordinate of the final coordinates may be determined in a similar way. Based on the resultant X-axis coordinate and Y-axis coordinate, it is able to determine the final coordinates of the touch point.

Due to the use of the grouping calculation mode, it is able to reduce the computational burden of the processor, thereby to reduce the overhead thereof.

In order to further reduce the computational burden of the processor, eliminate the noise and prevent the interference on the positioning of the touch from a sudden pulse, Step 13 of performing the grouping calculation on the plurality of initial coordinates of the touch point so as to determine the final coordinates of the touch point further may include: determining a relation between the absolute value of the difference and a second threshold, and when the absolute value of the difference is less than or equal to the second threshold, performing the subsequent Step 24 of determining the two groups of classified coordinates corresponding to the minimum absolute value of the difference.

In the embodiments of the present disclosure, when all the absolute values of the differences are greater than the second threshold, the initial coordinates in the corresponding groups of classified coordinates may be determined as ineffective data. A sampling point for the initial coordinates corresponding to the ineffective data may be regarded as an outlier, the initial coordinates corresponding to the outlier may be abandoned, and the procedure of determining the final coordinates of the touch point may be ended. When there are the absolute values of the differences that are small than or equal to the second threshold, the initial coordinates in the groups of classified coordinates corresponding to these absolute values of the differences may be determined as effective data, so as to perform the subsequent Step 24, i.e., to determine the two groups of classified coordinates corresponding to the minimum absolute value of the difference.

In the embodiments of the present disclosure, the second threshold may be 3, or any other values, which may be set in accordance with an actual application scenario or environment.

The touch positing method for the touch display device will be described hereinafter in details.

As shown in FIG. 3, the method may include the following steps.

Step 301: when it is detected that the touch operation has been made on the touch panel, acquiring a count change value for the channel capacitance corresponding to the touch region.

Step 302: determining whether or not the touch operation is effective according to the count change value. To be specific, when a difference between a maximum value of the count change values for the channel capacitance and a first reference value is greater than the first threshold, the touch operation may be determined as effective. When the touch operation is effective, it may proceed to Step 303, and otherwise return to Step 301.

Step 303: sampling the coordinate information about the touch point multiple times, so as to acquire a plurality of initial coordinates of the touch point.

Step 304: dividing the horizontal coordinates and the longitudinal coordinates of the initial coordinates into N groups, respectively, so as to obtain N groups of classified coordinates, respectively. N is divisible by the number of sampling times of the coordinate information about the touch point. For the N groups of classified coordinates of horizontal coordinates and for the N groups of classified coordinates of longitudinal coordinates, the following steps are performed, respectively, Step 305: calculating an average value of each group of classified coordinates.

Step 306: calculating a difference between any two of the average values of the groups of the classified coordinates, and acquiring an absolute value of the difference.

Step 307: determining a relation between the absolute value of the difference and the second threshold. When all the absolute values of the differences are greater than the second threshold, it may proceed to Step 310, i.e., the procedure of determining the final coordinates of the touch point may be ended, and the initial coordinates in the groups of classified coordinates corresponding to the absolute value of the difference may be determined as ineffective data and then abandoned. Otherwise, it may proceed to Step 308.

Step 308: determining the two groups of classified coordinates corresponding to the minimum absolute value of the difference.

Step 309: determining an average value of the initial coordinates recorded in the two groups of classified coordinates as a corresponding component of the final coordinates.

According to the touch positioning method in the embodiments of the present disclosure, it is able to eliminate the interference on the positioning of the touch point from the external environment, thereby to accurately position the touch point. In addition, due to the easy implementation and the use of the grouping calculation mode, it is able to reduce the overhead of the processor.

Figure 4:
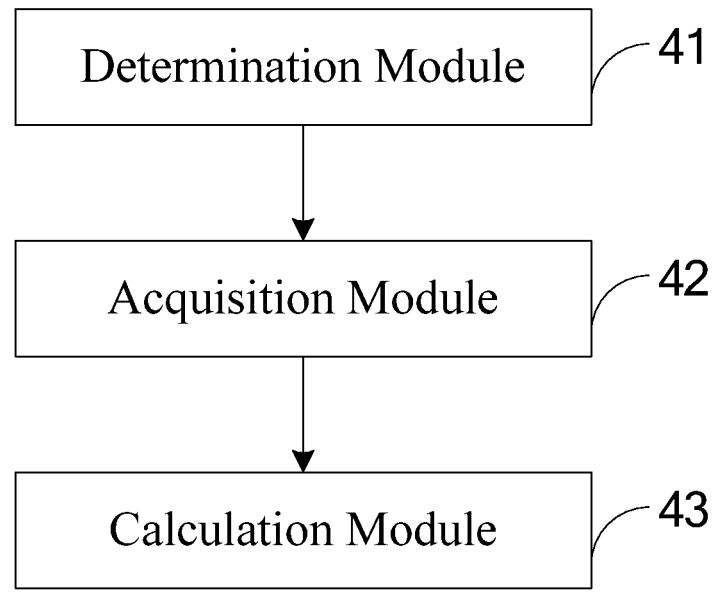
FIG. 4 is a schematic view showing a touch display device according to one embodiment of the present disclosure.

The present disclosure further provides in one embodiment a touch display device which, as shown in FIG. 4, may include: a determination module 41 configured to, when it is detected that a touch operation has been made on a touch panel, determine whether or not the touch operation is effective; an acquisition module 42 configured to, when the touch operation is effective, sample coordinate information about a touch point multiple times, so as to acquire a plurality of initial coordinates of the touch point; and a calculation module 43 configured to perform a grouping calculation on the plurality of initial coordinates of the touch point, so as to determine final coordinates of the touch point.

Figure 5:
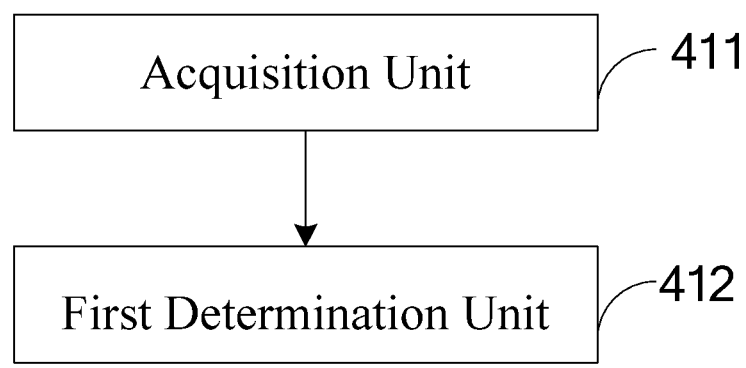
FIG. 5 is a schematic view showing a first acquisition module of the touch display device according to one embodiment of the present disclosure.

Alternatively, as shown in FIG. 5, the determination module 41 may include: an acquisition unit 411 configured to, when the touch operation has been made, acquire a count change value for a channel capacitance corresponding to a touch region; and a first determination unit 412 configured to, when a difference between a maximum value of the count change value and an original reference value is greater than a first threshold, determine that the touch operation is effective, the original reference value being an average value of a plurality of channel capacitances obtained within a predetermined time period before the touch operation, and the first threshold being a predetermined percentage of the original reference value.

Figure 6:
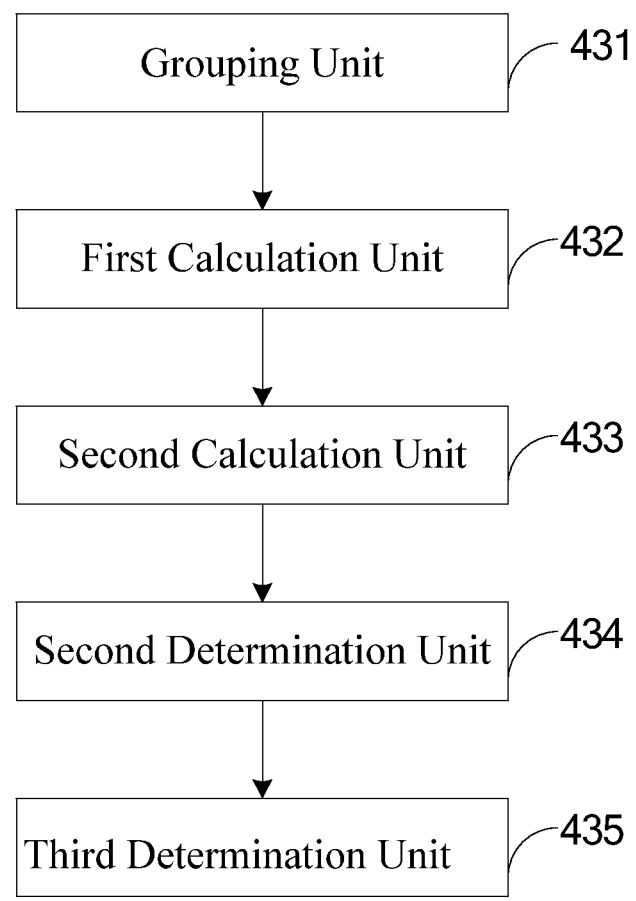
FIG. 6 is a schematic view showing a calculation module of the touch display device according to one embodiment of the present disclosure.

Alternatively, as shown in FIG. 6, the calculation module 43 may include: a grouping unit 431 configured to divide horizontal coordinates and longitudinal coordinates of the initial coordinates into N groups, respectively, so as to obtain N groups of classified coordinates, respectively, N being divisible by the number of sampling times of coordinate information about the touch point; a first calculation unit 432 configured to an average value of each group of classified coordinates; a second calculation unit 433 configured to calculate a difference between the average values of any two groups of classified coordinates, and acquire an absolute value of the difference; a second determination unit 434 configured to determine two groups of classified coordinates corresponding to a minimum absolute value of the difference; and a third determination unit 435 configured to determine an average value of the initial coordinates recorded in the two groups of classified coordinates as a corresponding component of the final coordinates.

Figure 7:
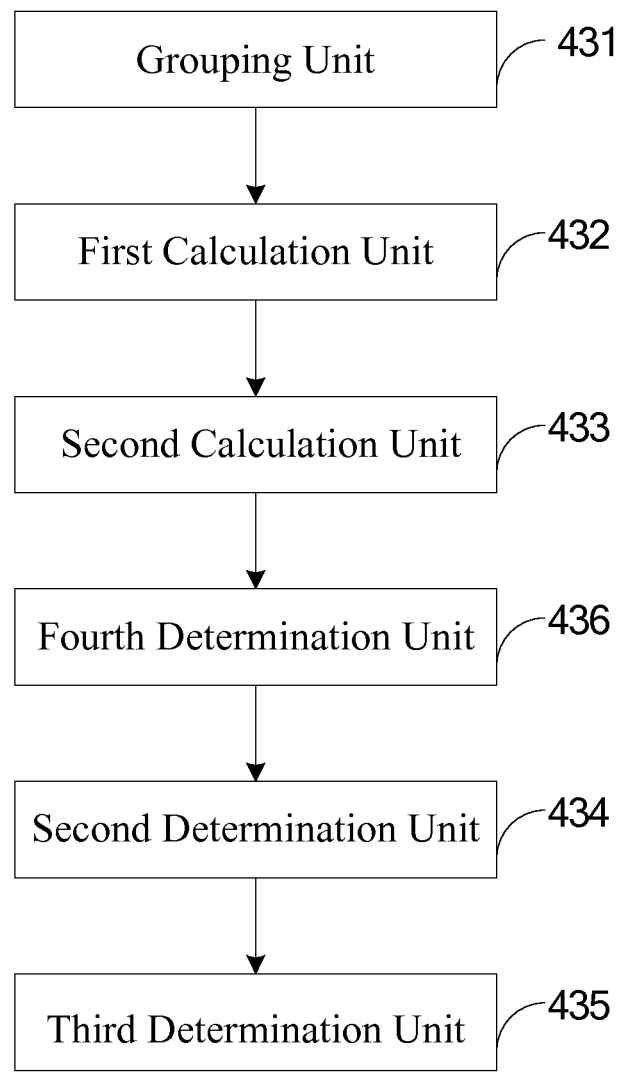
FIG. 7 is another schematic view showing the calculation module of the touch display device according to one embodiment of the present disclosure.

In another alternative embodiment, as shown in FIG. 7, the calculation module 43 may further include a fourth determination unit 436 configured to determine a relation between the absolute value of the difference and a second threshold, and when the absolute value of the difference is less than or equal to the second threshold, trigger the second determination unit to determine the two groups of classified coordinates corresponding to the minimum absolute value of the difference.

In the embodiments of the present disclosure, when all the absolute values of the differences are greater than the second threshold, the fourth determination unit 436 may determine the initial coordinates in the groups of classified coordinates corresponding to the absolute values of the differences as ineffective data, and abandon the ineffective data, and then a procedure of determining the final coordinates of the touch point may be ended.

When there are the absolute values of the differences that are less than or equal to the second threshold, the fourth determination unit 436 may determine the initial values in the groups of classified coordinates corresponding to the absolute values of the differences as effective data, and trigger the second determination unit 434 to determine the two groups of classified coordinates corresponding to the minimum absolute value of the difference.

According to the touch positioning method and the touch display device in the embodiments of the present disclosure, when it is detected that the touch operation has been made on the touch panel, it is determined whether or not the touch operation is effective. When the touch operation is effective, the coordinate information about the touch point is sampled multiple times, so as to acquire a plurality of initial coordinates of the touch point. Then, the grouping calculation is performed on the plurality of initial coordinates of the touch point, so as to determine the final coordinates of the touch point. As a result, it is able to eliminate the interference on the positioning of the touch point from an external environment, thereby to accurately position the touch point. In addition, due to the easy implementation as well as the use of a grouping calculation mode, it is able to prevent the overhead of a processor from being increased.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A touch positioning method for a touch display device, comprising:
    when it is detected that a touch operation has been made on a touch panel, determining whether the touch operation is effective;
    when the touch operation is effective, sampling coordinate information about a touch point multiple times to acquire a plurality of initial coordinates of the touch point;
    performing a grouping calculation on the plurality of initial coordinates of the touch point to determine final coordinates of the touch point,
    wherein performing the grouping calculation on the plurality of initial coordinates of the touch point to determine the final coordinates of the touch point comprises:
    dividing horizontal coordinates and longitudinal coordinates of the plurality of initial coordinates of the touch point into N groups, respectively, to obtain N groups of classified coordinates, respectively, N being divisible by a number of sampling times of coordinate information about the touch point;
    for the N groups of classified coordinates of horizontal coordinates and for the N groups of classified coordinates of longitudinal coordinates:
        calculating an average value of each group of classified coordinates;
        calculating a difference between the average values of any two groups of classified coordinates and acquiring an absolute value of the difference;
        determining two groups of classified coordinates corresponding to a minimum absolute value of the difference; and
        determining an average value of the plurality of initial coordinates of the touch point recorded in the two groups of classified coordinates as a corresponding component of the final coordinates of the touch point.

2. The touch positioning method according to claim 1, wherein performing the grouping calculation on the plurality of initial coordinates of the touch point to determine the final coordinates of the touch point further comprises:
    determining a relation between the absolute value of the difference and a second threshold, and when the absolute value of the difference is less than or equal to the second threshold, determining the two groups of classified coordinates corresponding to the minimum absolute value of the difference.

3. The touch positioning method according to claim 2, wherein the number of sampling times of coordinate information is 9, N is 3 and the second threshold is 3.

4. The touch positioning method according to claim 1, wherein when it is detected that the touch operation has been made on the touch panel, determining whether or not the touch operation is effective comprises:
    when the touch operation has been made, acquiring a count change value for a channel capacitance corresponding to a touch region; and
    when a difference between a maximum value of the count change value and an original reference value is greater than a first threshold, determining that the touch operation is effective, the original reference value being an average value of a plurality of channel capacitances obtained within a predetermined time period before the touch operation, and the first threshold being a predetermined percentage of the original reference value.

5. The touch positioning method according to claim 4, wherein for a mutual-capacitive touch panel, the channel capacitance is a coupling capacitance at a position where a touch driving electrode overlaps a touch sensing electrode, and for a self-capacitive touch panel, the channel capacitance is a capacitance of a sensing unit itself at a certain potential.

6. The touch positioning method according to claim 4, wherein the predetermined time period is a time period for 20 frames before the touch operation.

7. The touch positioning method according to claim 4, wherein the first threshold is 5% to 30% of the original reference value.

8. A touch display device, comprising:
    a determination module configured to, when it is detected that a touch operation has been made on a touch panel, determine whether the touch operation is effective;
    an acquisition module configured to, when the touch operation is effective, sample coordinate information about a touch point multiple times to acquire a plurality of initial coordinates of the touch point;
    a calculation module configured to perform a grouping calculation on the plurality of initial coordinates of the touch point, to determine final coordinates of the touch point,
    wherein the calculation module comprises:

a grouping unit configured to divide horizontal coordinates and longitudinal coordinates of the initial coordinates of the touch point into N groups, respectively, to obtain N groups of classified coordinates, respectively, N being divisible by a number of sampling times of coordinate information about the touch point;

a first calculation unit configured to an average value of each group of classified coordinates;

a second calculation unit configured to calculate a difference between the average values of any two groups of classified coordinates, and acquire an absolute value of the difference;

a second determination unit configured to determine two groups of classified coordinates corresponding to a minimum absolute value of the difference; and a third determination unit configured to determine an average value of the initial coordinates of the touch point recorded in the two groups of classified coordinates as a corresponding component of the final coordinates of the touch point.

9. The touch display device according to claim 8, wherein the determination module comprises:

an acquisition unit configured to, when the touch operation has been made, acquire a count change value for a channel capacitance corresponding to a touch region; and a first determination unit configured to, when a difference between a maximum value of the count change value and an original reference value is greater than a first threshold, determine that the touch operation is effective, the original reference value being an average value of a plurality of channel capacitances obtained within a predetermined time period before the touch operation, and the first threshold being a predetermined percentage of the original reference value.

10. The touch display device according to claim 8, wherein the calculation module further comprises:

a fourth determination unit configured to determine a relation between the absolute value of the difference and a second threshold, and when the absolute value of the difference is less than or equal to the second threshold, trigger the second determination unit to determine the two groups of classified coordinates corresponding to the minimum absolute value of the difference.

11. The touch display device according to claim 10, wherein the fourth determination unit is further configured to, when all the absolute values of the differences are greater than a second threshold, determine that the initial coordinates of the touch point in the groups of classified coordinates as ineffective data, and abandon the ineffective data.

12. The touch display device according to claim 10, wherein the second threshold is 3.

* * * * *